(12) United States Patent
Chen et al.

(10) Patent No.: US 10,840,532 B2
(45) Date of Patent: Nov. 17, 2020

(54) FLOW BATTERY WITH ELECTROLYTE REBALANCING SYSTEM

(71) Applicant: President and Fellows of Harvard College, Cambridge, MA (US)

(72) Inventors: Qing Chen, Cambridge, MA (US); Roy G. Gordon, Cambridge, MA (US); Michael J. Aziz, Concord, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 190 days.

(21) Appl. No.: 15/882,032

(22) Filed: Jan. 29, 2018

(65) Prior Publication Data

US 2018/0219241 A1   Aug. 2, 2018

Related U.S. Application Data

(60) Provisional application No. 62/451,336, filed on Jan. 27, 2017.

(51) Int. Cl.
| | |
|---|---|
| *H01M 6/50* | (2006.01) |
| *H01M 8/18* | (2006.01) |
| *H01M 8/20* | (2006.01) |
| *H01M 8/04276* | (2016.01) |
| *H01M 8/04007* | (2016.01) |

(52) U.S. Cl.
CPC ....... *H01M 8/188* (2013.01); *H01M 8/04007* (2013.01); *H01M 8/04276* (2013.01); *H01M 8/20* (2013.01); *H01M 2300/0005* (2013.01); *Y02E 60/528* (2013.01)

(58) Field of Classification Search
CPC ............. H01M 8/188; H01M 8/04007; H01M 8/04276; H01M 8/20; H01M 2300/0005
See application file for complete search history.

(56) References Cited

U.S. PATENT DOCUMENTS

| | | | |
|---|---|---|---|
| 3,238,066 | A | 3/1966 | Klass et al. |
| 3,288,641 | A | 11/1966 | Rightmire |
| 3,300,342 | A | 1/1967 | Klass |
| 4,578,323 | A | 3/1986 | Hertl et al. |
| 4,652,355 | A | 3/1987 | Noding |
| 4,711,828 | A | 12/1987 | Ishida et al. |
| 6,020,105 | A | 2/2000 | Wariishi |
| 6,033,784 | A | 3/2000 | Jacobsen et al. |
| 9,966,622 | B2 | 5/2018 | Huskinson et al. |

(Continued)

FOREIGN PATENT DOCUMENTS

| | | |
|---|---|---|
| CN | 102035007 A | 4/2011 |
| CN | 103000924 A | 3/2013 |

(Continued)

OTHER PUBLICATIONS

U.S. Appl. No. 16/324,951, Gordon et al.
(Continued)

*Primary Examiner* — Jane J Rhee
(74) *Attorney, Agent, or Firm* — Clark & Elbing LLP

(57) ABSTRACT

The present invention relates to flow battery systems including a flow battery and an electrolyte rebalancing system. In accordance with certain embodiments, the electrolytes used in the systems of the present invention are aqueous, and in one embodiment, bromine species are used as redox-active species.

7 Claims, 4 Drawing Sheets

(56) References Cited

U.S. PATENT DOCUMENTS

| | | |
|---|---|---|
| 2002/0088576 A1 | 7/2002 | Andoh et al. |
| 2006/0194151 A1 | 8/2006 | Inagaki et al. |
| 2007/0134520 A1 | 6/2007 | Shimomura et al. |
| 2007/0184309 A1 | 8/2007 | Gust, Jr. et al. |
| 2009/0017379 A1 | 1/2009 | Inatomi et al. |
| 2009/0094822 A1 | 4/2009 | Ohtsuka et al. |
| 2010/0112393 A1 | 5/2010 | Knuckey et al. |
| 2011/0027624 A1 | 2/2011 | Deane et al. |
| 2011/0045332 A1 | 2/2011 | Horne et al. |
| 2011/0189520 A1 | 8/2011 | Carter et al. |
| 2011/0223450 A1 | 9/2011 | Horne et al. |
| 2011/0284456 A1 | 11/2011 | Brozell |
| 2014/0186731 A1* | 7/2014 | Pham .............. H01M 8/04186 429/429 |
| 2014/0370403 A1 | 12/2014 | Narayan et al. |
| 2015/0079497 A1 | 3/2015 | Lavastre et al. |
| 2015/0104724 A1* | 4/2015 | Chang .............. H01M 10/4242 429/418 |
| 2015/0176037 A1 | 6/2015 | Amao et al. |
| 2015/0243991 A1* | 8/2015 | Huskinson .......... H01M 4/9008 429/72 |
| 2016/0229803 A1 | 8/2016 | Lin et al. |
| 2016/0248114 A1 | 8/2016 | Huskinson et al. |
| 2018/0048011 A1 | 2/2018 | Aziz et al. |

FOREIGN PATENT DOCUMENTS

| | | |
|---|---|---|
| CN | 105308785 A | 2/2016 |
| JP | S62-73577 A | 4/1987 |
| JP | H0419966 A | 1/1992 |
| JP | H08185868 A | 7/1996 |
| JP | 2002-100398 A | 4/2002 |
| WO | WO-2006/129635 A1 | 12/2006 |
| WO | WO-2011/131959 A1 | 10/2011 |
| WO | WO-2014/052682 A2 | 4/2014 |
| WO | WO-2014/204985 A1 | 12/2014 |
| WO | WO-2015/048550 A1 | 4/2015 |
| WO | WO-2016/144909 A1 | 9/2016 |
| WO | WO-2018/032003 A1 | 2/2018 |

OTHER PUBLICATIONS

Alt et al., "Evaluation of organic battery electrodes: voltammetric study of the redox behaviour of solid quinones," J Appl Electrochem. 2(3):193-200 (1972).

Borisova et al., "Simple Preparative Synthesis of Spinochrome E, a Pigment from Sea Urchins of the Genus *Echinothrix,*" Chem Nat Comp. 48(2):202-4 (2012).

Chen et al., "A quinone-bromide flow battery with 1 W/cm2 power density," published in final form as: J Electrochem Soc. 163(1):A5010-3 (2016) (9 pages) (author manuscript).

Conant et al., "Free and total energy changes in the reduction of quinones," J Am Chem Soc. 44(11):2480-93 (1922).

Conant et al., "Reduction potentials of quinones. I. The effect of the solvent on the potentials of certain benzoquinones," J Am Chem Soc. 45(9):2194-218 (1923).

Conant et al., "Reduction potentials of quinones. II. The potentials of certain derivatives of benzoquinone, naphthoquinone and anthraquinone," J Am Chem Soc. 46(8):1858-1881 (1924).

Diaz, "Analytical applications of 1,10-anthraquinones: A review," Talanta. 38(6):571-88 (1991).

EMD Millipore Corporation "Pyridinium chloride for synthesis—Material Safety Data Sheet," revised Aug. 22, 2013 (9 pages).

Er et al., "Computational design of molecules for an all-quinone redox flow battery," Chem Sci. 6(2):885-93 (2015).

Hori, Electrochemical CO2 reduction on metal electrodes. *Modern aspects of electrochemistry.* C. Vayenas et al., 89-189 (2008).

Hull et al., "Reversible hydrogen storage using CO2 and a proton-switchable iridium catalyst in aqueous media under mild temperatures and pressures," Nat Chem. 4(5):383-8 (2012).

Huskinson et al., "A metal-free organic-inorganic aqueous flow battery," Nature. 505(7482):195-8 (2014) (16 pages).

Huskinson et al., "Cycling of a quinone-bromide flow battery for large-scale electrochemical energy storage," published in final form as: ECS Trans. 61(37):27-30 (2014) (4 pages) (author manuscript).

Huskinson et al., "Novel quinone-based couples for flow batteries," published in final form as: ECS Trans. 53(7):101-5 (2013) (5 pages) (author manuscript).

Li et al., "$CO_2$ reduction at low overpotential on Cu electrodes resulting from the reduction of thick $Cu_2O$ films," J Am Chem Soc. 134(17):7231-4 (2012).

Lin et al., "Alkaline quinone flow battery," published in final edited form as: Science. 349(6255):1529-32 (2015) (27 pages).

Nawar et al., "Benzoquinone-hydroquinone couple for flow battery," published in final form as: MRS Proceedings. 1491:mrsf12-1491 (2013) (6 pages) (author manuscript).

Nielson et al., "Electron Self-Exchange Kinetics for a Water-Soluble Ferrocenium/Ferrocene Couple: Rate Modulation via Charge Dependent Calix[6]arene-p-sulfonate Encapsulation," Inorg Chem. 35(5):1402-4 (1996).

Pubchem, Substance Record for SID 142148551, <https://pubchem.ncbi.nlm.nih.gov/substance/142148551#section=Top>, available date Aug. 20, 2012, retrieved Jun. 20, 2016 (6 pages).

Rasmussen, "A single substance organic redox flow battery," ESS, 2012 (Poster presentation).

Wang et al., "Anthraquinone with tailored structure for a nonaqueous metal-organic redox flow battery," Chem Commun (Camb). 48(53):6669-71 (2012).

Weber et al., "Redox flow batteries: a review," J Appl Electrochem 41:1137-64 (2011).

Xu et al., "A study of tiron in aqueous solutions for redox flow battery application," Electrochimica Acta. 55: 715-20 (2010).

Xu et al., "Novel organic redox flow batteries using soluble quinonoid compounds as positive materials," IEEE. (4 pages) (2009).

Yao et al., "High-capacity organic positive-electrode material based on a benzoquinone derivative for use in rechargeable lithium batteries," J Power Sources. 195(24): 8336-40 (2010).

* cited by examiner

H$_2$O-HBr phase diagram based on the azeotrope point at 1 bar

FLOW BATTERY WITH ELECTROLYTE REBALANCING SYSTEM

STATEMENT REGARDING FEDERALLY SPONSORED RESEARCH

This invention was made with government support under grant number DE-AR0000348 from the Advanced Research Projects Agency—Energy—U.S. Department of Energy. The government has certain rights to the invention.

BACKGROUND OF THE INVENTION

Intermittent renewable electrical power sources such as wind and photovoltaics (PV) cannot replace a significant fraction of our current fossil fuel-based electrical generation unless the intermittency problem is solved. Fluctuations in renewable source power are generally backed up by natural gas fired "peaker" plants. Inexpensive, reliable energy storage at or near the generation site could render the renewable source dispatchable (e.g. demand-following). It could also permit full utilization of the transmission capacity of power lines from the generation site, permitting supply capacity expansion while deferring the need for transmission capacity expansion.

A flow battery is a fully rechargeable electrical energy storage device where electrolyte fluids containing redox-active species are pumped through a cell, promoting reduction/oxidation on both sides of an ion-permeable membrane, which results in an electrical potential. Electrolytes are stored in external reservoirs, usually one corresponding to the negative electrode and one to the positive electrode.

The advantages of flow batteries are giving them increased attention for grid-scale electrical storage (T. Nguyen and R. F. Savinell, *Electrochem. Soc. Int.* 19, 54 (2010)); because all of the reactants and products are stored in reservoirs outside the electrochemical conversion device, the device itself may be optimized for the required power while the required energy is independently determined by the mass of reactant and the size of storage reservoirs. This can drive down the storage cost per kWh, which is the single most challenging requirement for grid-scale storage. In contrast, in solid electrode batteries the energy/power ratio (i.e. the peak-power discharge time) does not scale and is inadequate for rendering intermittent renewable power sources dispatchable. Most solid-electrode batteries have peak-power discharge times <1 hr., whereas rendering PV and wind dispatchable requires many hours to days (J. S. Rugolo and M. J. Aziz, *Energy & Env. Sci.* 5, 7151 (2012)).

Because redox-active species are in solution or suspension in flow batteries, redox-active species may cross over the membrane and contaminate the other side, resulting in a loss of capacity. While a contaminated electrolyte can be removed and replaced in a flow battery, such replacement is wasteful. Thus, there exists a need for a system that can reduce crossover contamination.

SUMMARY OF THE INVENTION

In one aspect, the invention provides a redox flow battery system including a redox flow battery having a first electrolyte, e.g., aqueous, in a first reservoir, the first electrolyte having a first redox-active species, a second electrolyte, e.g., aqueous, in a second reservoir, the second electrolyte having a second redox-active species, and a battery cell having a first compartment in fluid communication with the first reservoir, a second compartment in fluid communication with the second reservoir, an ion permeable membrane separating the first and second compartments, a first electrode in contact with the first compartment, and a second electrode in contact with the second compartment. The first redox-active species is capable of crossing the membrane and contaminating the second electrolyte. The redox flow battery further includes an electrolyte rebalancing system in fluid communication with the second reservoir, and optionally the first reservoir, wherein the electrolyte rebalancing system is configured to reduce the amount of first redox-active species contaminating the second electrolyte.

In certain embodiments, the electrolyte rebalancing system includes a heating unit in fluid communication with the second reservoir and coupled to a condenser in fluid communication with the first reservoir and the second reservoir. The electrolyte rebalancing system may further include a heat exchanger in fluid communication with the second reservoir and the heating unit, where the condenser is in fluid communication with the first reservoir and the heat exchanger.

In a specific embodiment, the first redox-active species is bromine or bromide. In some embodiments, the heating unit is maintained at below the boiling point of an $H_2O$—HBr azeotrope at a given pressure of the heating unit. In accordance with embodiments, the bromine or bromide in the first electrolyte may be in a concentration of up to 17 mol %, e.g., between about 4 mol % and 8 mol %, such as about 4 mol %.

In a related aspect, the invention features an apparatus including a first electrolyte reservoir, a second electrolyte reservoir, and a battery cell having a first compartment in fluid communication with the first electrolyte reservoir, a second compartment in fluid communication with the second electrolyte reservoir, a first electrode in contact with the first compartment, and a second electrode in contact with the second compartment. The apparatus further includes an electrolyte rebalancing system in fluid communication with the first reservoir and the second reservoir. The electrolyte rebalancing system includes a heating unit in fluid communication with the second reservoir and is coupled to a condenser, e.g., one in fluid communication with the first reservoir and the second reservoir.

In accordance with embodiments, the electrolyte rebalancing system includes a heat exchanger in fluid communication with the second reservoir and the heating unit, and the condenser is in fluid communication with the first reservoir and the heat exchanger.

In a further aspect, the invention features a method of rebalancing electrolyte in a flow battery having a first electrolyte comprising a solvent, e.g., aqueous, in a first reservoir, the first electrolyte including a first redox-active species that forms an azeotrope with the solvent, e.g., water; a second electrolyte, e.g., aqueous, in a second reservoir, the second electrolyte including a second redox-active species; and a battery cell having a first compartment in fluid communication with the first reservoir and a second compartment in fluid communication with the second reservoir. The first compartment and second compartment are separated by an ion permeable membrane, and the first redox-active species contaminates the second electrolyte, producing a contaminated electrolyte. The method includes the steps of heating the contaminated electrolyte to a temperature below the boiling point of the azeotrope to produce a vapor; condensing the vapor to produce a liquid phase and a vapor phase, wherein the liquid phase has a concentration of the first redox-active species greater than the concentration of the first redox-active species in the vapor phase; and directing the liquid phase into the first reservoir or to waste.

In some embodiments, the method includes condensing the vapor phase and directing the condensed vapor into the second reservoir. In further embodiments, condensing the vapor includes passing the vapor through a counter-flow heat exchanger that heats the contaminated electrolyte upstream of the heating unit.

In accordance with embodiments, the second redox-active material does not enter the vapor phase in the heating unit and is directed from the heating unit back into the second reservoir. In further embodiments, the second redox-active material is passed through a counter-flow heat exchanger to heat contaminated electrolyte before the second redox-active material is directed back into the second reservoir.

In accordance with embodiments, the first redox-active material includes bromine or bromide. The first electrolyte may have a concentration of up to about 17 mol % HBr, e.g., between about 4 mol % and 8 mol % HBr, such as about 4 mol % HBr.

In certain embodiments, the heating is kept below the boiling point temperature of the azeotrope, e.g., $H_2O$—HBr, at a given pressure of the heating unit, e.g., heating is maintained at 1 bar.

In other embodiments, the temperature of the heating is maintained at between about 100° C. and less than 126° C., e.g., 115° C. and 126° C., e.g., or between about 120° C. and 125° C.

As used herein, a contaminated electrolyte refers to an electrolyte containing a redox-active species contaminant having a redox-active charge type that differs from the charge type of the dominant redox-active species in an electrolyte. For example, a contaminated electrolyte may be a negative electrolyte containing positive redox-active species.

As used herein, electrolytes are solutions, e.g., aqueous, containing one or more redox-active species. A first electrolyte contains a first redox-active species, and a second electrolyte contains a second redox-active species. In some embodiments, during discharge, the first electrolyte is a positive electrolyte containing one or more positive redox-active species, and the second electrolyte is a negative electrolyte containing one or more negative redox-active species.

As used herein, a redox-active species is any chemical component capable of participating in the oxidation-reduction reaction of a flow battery. A positive redox-active species is capable of being reduced during discharge, whereas a negative redox-active species is capable of being oxidized during discharge.

DETAILED DESCRIPTION OF THE INVENTION

The invention provides flow battery systems having rechargeable flow batteries and electrolyte rebalancing systems. In flow batteries, at least one of the redox-active species exists in a liquid or a gas phase. Many of these liquid or gas redox-active species have a tendency to cross through the cell membrane. When these crossover events occur, they can negatively affect the performance of a flow battery. For example, a redox-active species that has crossed over a flow battery cell membrane can directly chemically react with other redox-active species, which causes a loss of capacity. Additionally, crossover events can reduce the charge and discharge capacity of a battery since the redox-active species that has crossed over is no longer capable of participating in electrochemical charge and discharge cycles. The electrolyte rebalancing system of the invention acts to reduce crossover contamination for contaminating species that are capable of being enriched in a vapor phase, e.g., of water. The rebalancing system operates by heating the contaminated electrolyte to form a vapor phase.

The vapor phase is then condensed to produce a liquid enriched in the contaminant and returned to the appropriate side of the battery cell. In some embodiments, the flow batteries employ bromine and bromide as positive redox-active species, which contaminate the negative side of the battery, and the systems of the invention find particular use in reducing bromine/bromide contamination in a negative electrolyte.

Figure 1:
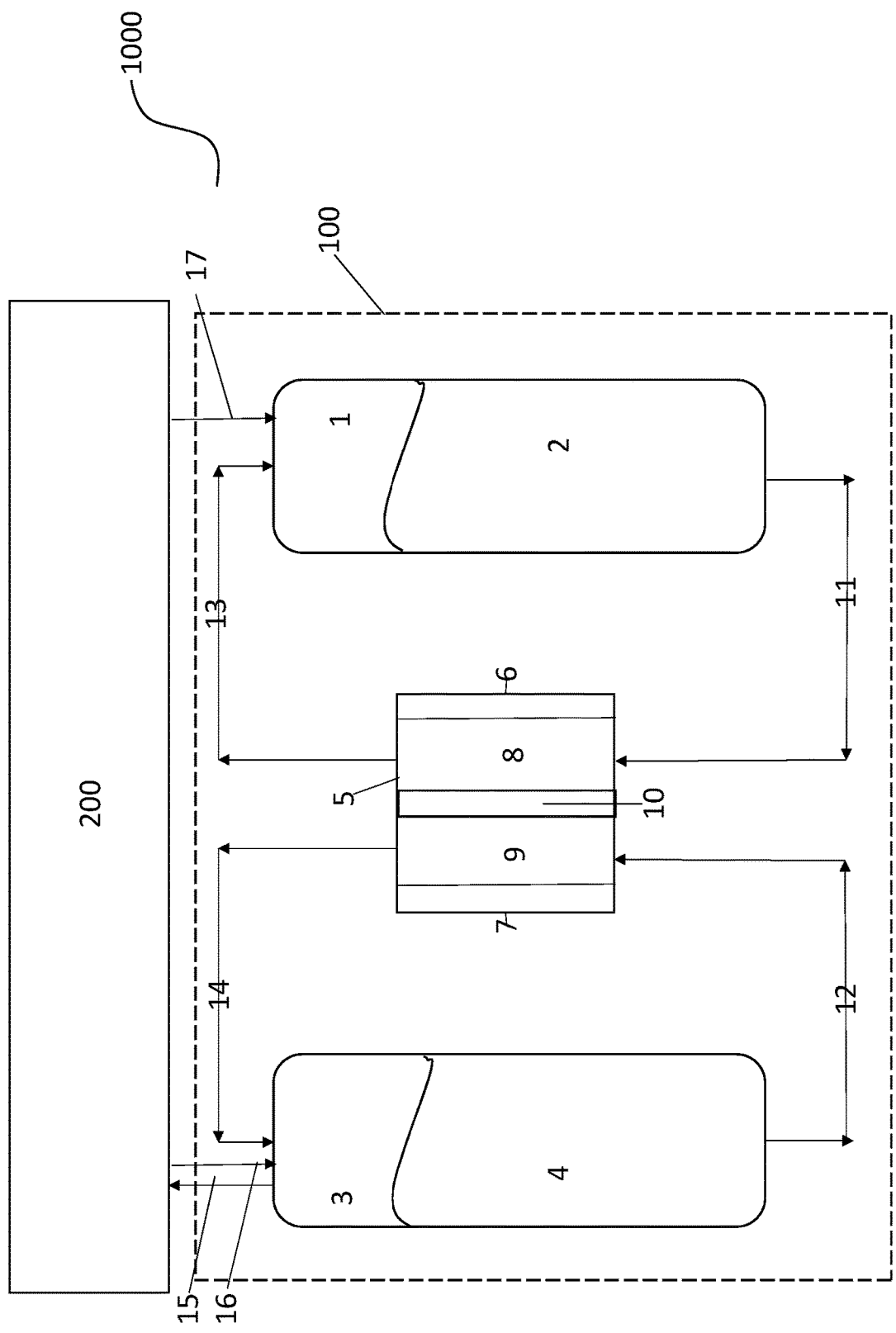
FIG. 1 is a schematic of a flow battery system in accordance with aspects and embodiments of the invention.

An exemplary flow battery system of the present invention is shown in FIG. 1. Flow battery system 1000 has flow battery 100 and electrolyte rebalancing system 200. Flow battery 100 has first electrolyte reservoir 1 containing first electrolyte 2 (containing a first redox-active species) and second electrolyte reservoir 3 containing second electrolyte 4 (containing a second redox-active species). Reservoir 1 and reservoir 3 are each in fluid communication with battery cell 5. Cell 5 includes first electrolyte compartment 8 and first electrode 6 and second electrolyte compartment 9 and second electrode 7. Ion permeable membrane 10 is positioned between compartments 8 and 9. First electrolyte reservoir 1 is in fluid communication with first electrolyte compartment 8 via conduits 11 and 13, and second electrolyte reservoir 3 is in fluid communication with second electrolyte compartment 9 via conduits 12 and 14. Second electrolyte reservoir 3 is in fluid communication with electrolyte rebalancing system 200 via conduits 15 and 16 and first electrolyte reservoir 1 is in fluid communication with electrolyte rebalancing system 200 via conduit 17. Both first electrolyte 2 and second electrolyte 4 may be aqueous. When in discharge, first electrolyte reservoir 1 may be a positive electrolyte reservoir, first electrolyte 2 may be a positive electrolyte, first electrolyte compartment 8 may be a positive electrolyte compartment and first electrode 6 may be a positive electrode, e.g., a cathode. When in discharge, second electrolyte reservoir 3 may be a negative electrolyte reservoir, second electrolyte 4 may be a negative electrolyte, second electrolyte compartment 9 may be a negative electrolyte compartment and second electrode 7 may be a negative electrode, e.g., an anode.

During charge or discharge, first redox-active species may cross over membrane 10 and contaminate the second electrolyte 2. When this occurs, contaminated electrolyte is transferred from the second electrolyte reservoir 3 to the electrolyte rebalancing system 200.

Figure 2:
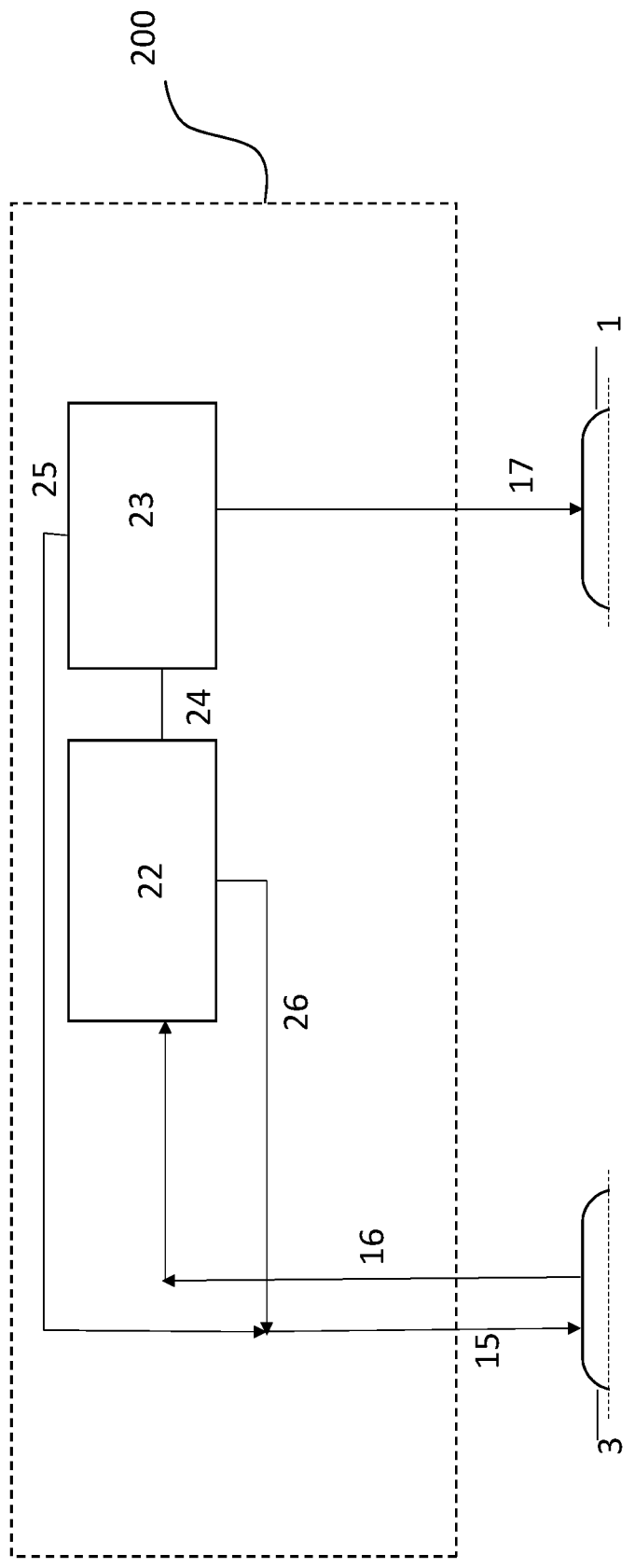
FIG. 2 is a schematic of an electrolyte rebalancing system in accordance with aspects and embodiments of the invention.

Electrolyte rebalancing system 200 is shown in FIG. 2. System 200 has heating unit 22 and condenser 23. Heating unit 22 is in fluid communication with second electrolyte reservoir 3 via conduit 16 and via conduit 26, which may feed into conduit 15 or return directly to reservoir 3. Heating unit 22 is coupled to condenser 23 by conduit 24, which may be configured to allow flow of gas and not liquid. Condenser 23 is in fluid communication with first electrolyte reservoir 1 via conduit 17, and condenser 23 is in fluid communication with second electrolyte reservoir 3 via conduit 25, which feeds into conduit 15.

Contaminated electrolyte is transferred from reservoir 3 to heating unit 22, which heats the liquid to produce a vapor phase including the first redox-active species. The vapor passes into condenser 23, which is at a lower temperature than the heating unit and causes the vapor to condense to form a liquid enriched in the first redox-active species. The condensed vapor, enriched in the first redox-active species, can then be returned to reservoir 1 (or discarded). The condenser may also allow a vapor phase, e.g., water rich, to pass through, which is then returned to reservoir 3. Any remaining liquid in the heating unit 22 may also be returned to reservoir 3.

Figure 3:
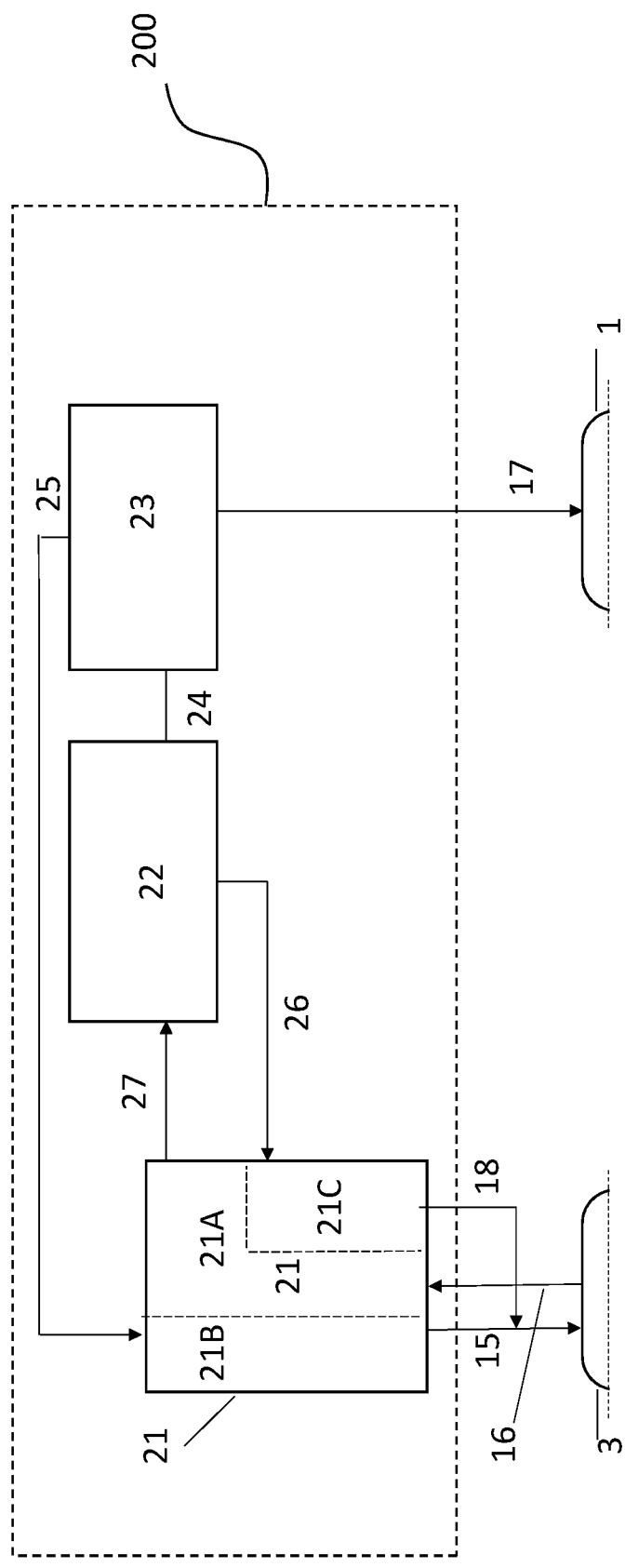
FIG. 3 is a schematic of an electrolyte rebalancing system in accordance with aspects and embodiments of the invention.

In accordance with some embodiments and as shown in FIG. 3, the electrolyte rebalancing system may include a heat exchanger 21 and conduits 15-18 and 24-27. The heat exchanger may be employed to reduce the energy required to heat contaminated electrolyte in the heating unit or cool vapor, e.g., water rich, returning to reservoir 3. The heat exchanger may have three compartments so that contaminated electrolyte passing through compartment 21A is heated by vapor or condensate returning from condenser 23 in compartment 21B and/or liquid returning from the heating unit via compartment 21C. All fluids returning to reservoir 3 may also pass through a single compartment for a heat exchanger having two compartments.

The flow battery system of the present invention may be operated by one or more manual or automated protocols. The concentration of contaminant in an electrolyte may be monitored directly by manual or automated sampling to determine the concentration of contaminant present or may be monitored indirectly, e.g., by monitoring changes in the battery capacity. The electrolyte rebalancing system may be employed only when the concentration of a contaminant exceeds a threshold value. The rebalancing system may be operated until the concentration of the contaminant falls below a threshold value or may be operated for a specific, set period of time. One or more sensors or sensor systems may be employed to monitor electrolyte contamination. The sensors may be in communication with the electrolyte rebalancing system to provide an automated protocol such that when the concentration of a contaminant reaches a first threshold value, contaminated electrolyte is automatically directed into the electrolyte rebalancing system. The sensor system may shut off the rebalancing system after a specific period of time and/or when the concentration of contaminant falls below a second threshold value. The first threshold value and the second threshold value may be the same value or may be different values.

As is apparent, the systems of the invention may be employed when the contaminating substance is either the positive or negative redox-active species. Furthermore, although various conduits are drawn as either separate or connected, such conduits may be combined when taking materials from the same reservoir or returning them to the same reservoir. Similarly, conduits may not be necessary if two components of the system are directly connected.

Systems Materials

Materials for reservoirs, cells, and conduits for use in flow batteries are known in the art, e.g., plastics, glass, metals, and ceramics. Heating units, condensers, and heat exchangers are also known. For example, the heating unit may employ resistive or inductive heating elements, Peltier, or a liquid, e.g., water or oil, or gas, e.g., air, bath. Condensers may be air or gas cooled or jacketed with a cooling liquid, e.g., water or electrolyte. Heat exchange devices are also known that allow counter flows of liquids or liquid and gas and thermal conductivity between the two materials.

Redox-Active Species

The present system is operable with any potential contaminating species that is capable of being condensed into an enriched liquid, without itself being contaminated. In certain embodiments, the potential contaminating species forms an azeotrope with water, while the other species does not form an azeotrope with water. The non-contaminating species also preferably does not produce an appreciable vapor pressure at the temperature of the heating unit. Examples of positive redox-active species include bromine and bromide. Suitable negative species include hydroquinones/quinones (as disclosed in US 2015/0243991, US 2016/0248114, and WO 2016/144909, the hydroquinone/quinone disclosures of which are hereby incorporated by reference).

Electrode Materials

Electrodes may be carbon or metal electrodes. Electrodes for use with aqueous bromine and bromide include any carbon electrode, e.g., glassy carbon electrodes, carbon paper electrodes, carbon felt electrodes, or carbon nanotube electrodes. Titanium or platinum electrodes may also be employed. Other electrodes suitable for redox-active species are known in the art.

Ion Permeable Membranes

Ion permeable membranes allow the passage of protons but not a significant amount of other ions, for example, bromine and bromide species or other redox-active species. Example ion permeable membranes include NAFION®, i.e., sulfonated tetrafluoroethylene based fluoropolymer-copolymer, hydrocarbons, e.g., polyethylene, and size exclusion barriers, e.g., ultrafiltration or dialysis membranes with a molecular weight cut off of 100, 250, 500, or 1,000 Da. Porous physical barriers may also be included when the passage of redox-active species other than protons is tolerable.

Additional Components

A battery of the invention may include additional components as is known in the art. A battery may further include pumps to pump fluids into the battery cell and/or past one or both electrodes and into, within, and out of the electrolyte rebalancing system.

Example

Hardware from Fuel Cell Tech. (N.Mex., Albuquerque) may be used to assemble a zero-gap flow cell configuration, similar to previous reports (Aaron, D. S. et al. *Journal of Power Sources* 206, 450-453 (2012)), and in accordance with FIG. 1, and with aqueous bromide as a positive redox-active species (during discharge) in the positive electrolyte. The positive electrolyte contains up to 17 mol % HBr, e.g., 4 mol % to about 8 mol % HBr, and, in some embodiments, the positive electrolyte contains about 4 mol % HBr. Both positive and negative electrolytes may initially be at a fully charged state.

Figure 4:
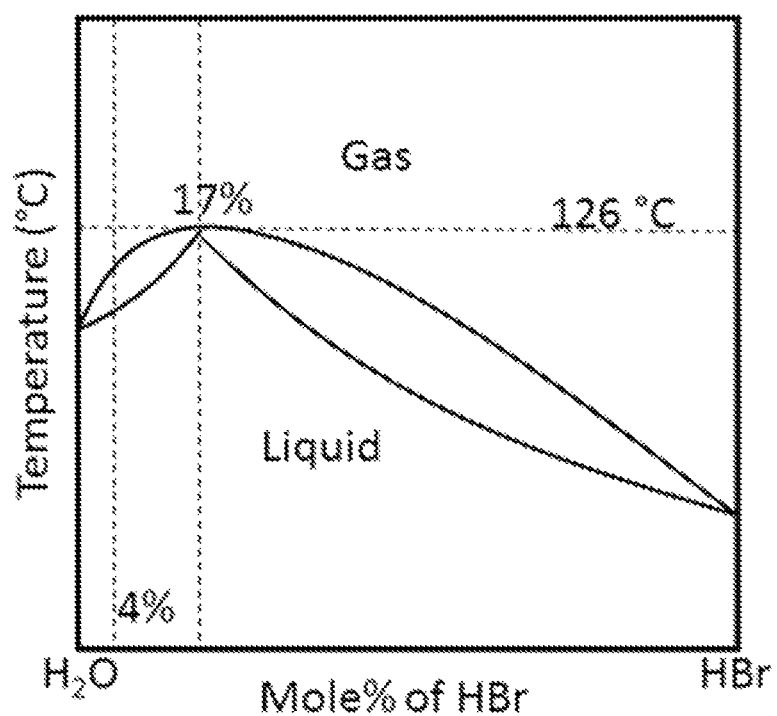
FIG. 4 is a $H_2O$—HBr phase diagram based on the azeotrope point at 1 bar.

Bromine species may spontaneously cross over the ion permeable membrane into the negative electrolyte. Negative electrolyte contaminated with bromine species may be transferred to an electrolyte rebalancing system in accordance with FIG. 2 or 3. The contaminated electrolyte may be transferred to a heat exchanger and then to a heating unit. The temperature of the heating unit may be kept slightly below the boiling point of the $H_2O$—HBr azeotrope temperature at the pressure in the heating unit, but above the condenser temperature. For example, with the heating unit held at a pressure of 1 bar, the temperature may be kept below the boiling point of the azeotrope at 1 bar, as shown in FIG. 4, e.g., between about 100° C. and 126° C., such as between about 115° C. and 126° C., or 120° C. and 125° C. If, for example, the heating unit was held at different pressure, the heating temperature would be adjusted accordingly, as would the condenser temperature, if necessary. Upon entering the condenser, an HBr-enriched liquid phase of the heated contaminated negative electrolyte condenses and is returned to the positive electrolyte. As shown in FIG. 4, the HBr-enriched liquid phase recovered at slightly below the azeotrope boiling point temperature, e.g., between 120° C. and 125° C., at 1 bar, has a concentration of about 17 mol % HBr, a concentration greater than the concentration of bromine species in the positive electrolyte. The water-rich vapor phase in the condenser exits and is transferred to a counter-flow heat exchanger such that its condensation can pre-heat the contaminated negative electrolyte before it enters the heating unit. Negative redox-active species remaining in the heating unit, i.e., redox-active species that do not enter the vapor phase, are returned to the negative electrolyte reservoir.

Other embodiments are in the claims.

What is claimed is:

1. A redox flow battery system comprising:
a redox flow battery having a first electrolyte in a first reservoir, the first electrolyte comprising a first redox-active species, a second electrolyte in a second reservoir, the second electrolyte comprising a second redox-active species, and a battery cell having a first compartment in fluid communication with the first reservoir, a second compartment in fluid communication with the second reservoir, an ion permeable membrane separating the first and second compartments, a first electrode in contact with the first compartment, and a second electrode in contact with the second compartment,
wherein the first redox-active species is capable of crossing the membrane and contaminating the second electrolyte; and
an electrolyte rebalancing system in fluid communication with the second reservoir, wherein the electrolyte rebalancing system is configured to reduce the amount of first redox-active species contaminating the second electrolyte, and wherein the electrolyte rebalancing system is configured to return the first redox-active species to the first reservoir.

2. The system of claim 1, wherein the electrolyte rebalancing system comprises a heating unit in fluid communication with the second reservoir and coupled to a condenser, wherein the condenser is in fluid communication with the first reservoir and the second reservoir.

3. The system of claim 2, wherein the electrolyte rebalancing system further comprises a heat exchanger, wherein the heat exchanger is in fluid communication with the second reservoir and the heating unit, and the condenser is in fluid communication with the first reservoir and the heat exchanger.

4. The system of claim 1, wherein the first redox-active species comprises bromine or bromide.

5. The system of claim 2, wherein the heating unit is maintained at below the boiling point of an $H_2O$—HBr azeotrope at a given pressure of the heating unit.

6. The system of claim 5, wherein the bromine or bromide in the first electrolyte is in a concentration of up to 17 mol %.

7. The system of claim 6, wherein the bromine or bromide in the first electrolyte is in a concentration of between about 4 mol % and 8 mol %.

* * * * *